US011893726B2

(12) United States Patent
Shumka et al.

(10) Patent No.: US 11,893,726 B2
(45) Date of Patent: Feb. 6, 2024

(54) IMAGING SYSTEM FOR ASSESSING INTEGRITY OF METAL MOTIVE PARTS IN INDUSTRIAL PLANTS

(71) Applicants: Jason Shumka, Kelowna (CA); Thomas Shumka, Kelowna (CA)

(72) Inventors: Jason Shumka, Kelowna (CA); Thomas Shumka, Kelowna (CA)

(*) Notice: Subject to any disclaimer, the term of this patent is extended or adjusted under 35 U.S.C. 154(b) by 423 days.

(21) Appl. No.: 17/299,738

(22) PCT Filed: Sep. 17, 2019

(86) PCT No.: PCT/CA2019/000130
§ 371 (c)(1),
(2) Date: Jun. 3, 2021

(87) PCT Pub. No.: WO2020/113308
PCT Pub. Date: Jun. 11, 2020

(65) Prior Publication Data
US 2022/0020137 A1   Jan. 20, 2022

(30) Foreign Application Priority Data

Dec. 5, 2018 (CA) .................................. CA 3026919

(51) Int. Cl.
*G01M 13/021* (2019.01)
*G06T 7/00* (2017.01)
(Continued)

(52) U.S. Cl.
CPC ........... *G06T 7/001* (2013.01); *G01M 13/021* (2013.01); *G01N 21/952* (2013.01); *G06T 7/13* (2017.01);
(Continued)

(58) Field of Classification Search
USPC ........................................................ 73/162
See application file for complete search history.

(56) References Cited

U.S. PATENT DOCUMENTS

| 4,798,963 A | 1/1989 | Wittkopp |
| 5,373,735 A * | 12/1994 | Gutman ............... G01M 13/021 356/23 |

(Continued)

FOREIGN PATENT DOCUMENTS

| CN | 112182983 A * | 1/2021 | ............. G06F 30/27 |
| DE | 102015210347 | 12/2016 | |

(Continued)

OTHER PUBLICATIONS

International Search Report for PCT/CA2019/000130, dated Nov. 25, 2019, 3 pages.

(Continued)

*Primary Examiner* — Daniel S Larkin
(74) *Attorney, Agent, or Firm* — Baumgartner Patent Law; Marc Baumgartner (57) ABSTRACT

An installation, for use with a computer, for inspecting pinion gear teeth, the installation comprising: an enclosure, the enclosure including a back, a top, a bottom, sides and a front, which includes an opening, to define an interior; a transparent window, the transparent window separating at least a part of the interior from an ambient environment; at least one door operatively connected to the enclosure and retractably separating the transparent barrier from the ambient environment; a programmable logic controller which is housed in the enclosure behind the transparent window; a thermal imager which is housed in the enclosure behind the transparent window, is directed to the transparent window and is in electronic communication with the programmable logic controller; a visible light camera which is housed in the enclosure behind the transparent window, is directed to the transparent window and is in electronic communication with the programmable logic controller; and an air blade blower (Continued)

which is attached to the enclosure and is positioned to provide an air blade in front of the transparent window.

19 Claims, 7 Drawing Sheets

(51) Int. Cl.
    *G01N 21/952*     (2006.01)
    *H04N 5/225*     (2006.01)
    *G06T 7/13*     (2017.01)
    *H04N 23/51*     (2023.01)

(52) U.S. Cl.
    CPC ......... *H04N 23/51* (2023.01); *G06T 2200/24* (2013.01); *G06T 2207/10048* (2013.01); *G06T 2207/30164* (2013.01)

(56) References Cited

U.S. PATENT DOCUMENTS

| | | | |
|---|---|---|---|
| 5,610,994 A * | 3/1997 | Stadtfeld | G06T 7/0004 382/152 |
| 6,148,098 A | 11/2000 | Rutschke et al. | |
| 6,992,315 B2 | 1/2006 | Twerdochlib | |
| 2008/0028846 A1 | 2/2008 | Heath et al. | |
| 2011/0125420 A1 | 5/2011 | Garvey', III et al. | |
| 2017/0011503 A1 | 1/2017 | Newman | |
| 2017/0052150 A1 | 2/2017 | Zalameda et al. | |
| 2017/0356824 A1 | 12/2017 | Zhang et al. | |
| 2019/0064031 A1 * | 2/2019 | Mies | G01B 21/047 |

FOREIGN PATENT DOCUMENTS

| | | | |
|---|---|---|---|
| EP | 2330398 | 6/2011 | |
| JP | 58-161802 | * 9/1983 | .......... G01M 13/021 |
| JP | 2844727 | 1/1999 | |

OTHER PUBLICATIONS

Written Opinion of the International Searching Authority for PCT/CA2019/000130, dated Nov. 25, 2019, 3 pages.

* cited by examiner

IMAGING SYSTEM FOR ASSESSING INTEGRITY OF METAL MOTIVE PARTS IN INDUSTRIAL PLANTS

CROSS-REFERENCE TO RELATED APPLICATIONS

The present invention is filed under 35 U.S.C. § 371 as the U.S. national phase of International Application No. PCT/CA2019/000130, filed Sep. 17, 2019, which claims the benefit of priority to Canadian Patent Application No. 3,026,919, filed Dec. 5, 2018, each of which is hereby incorporated in its entirety, including all tables, figures, and claims.

FIELD

The present technology is an infrared and visible light-based system for imaging surfaces of metal mating members that contact and move over one another repeatedly. More specifically, it is a robust installation for non-destructive testing of gears for wear and damage that includes an infrared camera, a visible light camera, related electronics and at least one light transparent barrier to protect the components from damaging debris.

BACKGROUND

Gears used in industrial setting are subject to wear and damage, both of which results in down time while a new gear is purchased and installed, or the damage is repaired. This is especially true in industries such as the mining industry, where rock is crushed and moved by gear systems. Despite the high cost of down time, there are few systems in place to monitor the integrity of these moving parts.

Other dynamic conditions where mating surfaces contact and move over one another repeatedly include slides and carriage guides, bearing surfaces, thrust surfaces, gears, end plates, latches and pivots.

The use of infrared cameras to inspect parts and monitor damage progression is disclosed in the prior art. For example, United States Patent Application 20170052150 discloses a system for monitoring damage progression in a composite structure includes a load sensor, acoustic emission sensors, a camera, and a monitoring device. The load sensor measures an applied load to the structure. The sensors measure acoustic emission data indicative of possible damage to the structure. The camera captures image data of the structure in a designated portion of the electromagnetic spectrum. The monitoring device executes a method by which the acoustic emission data is synchronously collected with the image data and the applied load. The device automatically maps the acoustic emission data onto the image data to detect an area of damage progression in the composite structure. A failure event in the detected area of damage progression may be predicted using the mapped data, and a control action may be executed in response to the predicted failure event. The camera may capture infrared images and this, in combination with the acoustic emission data are used to detect an area of damage. The lack of a visible light camera would prevent this system from allowing a user to identify the area of damage or wear, for example on a specific tooth of a gear. This system is for testing composites in relation to the load applied in a laboratory setting. It would not be suitable for assessing gear integrity in situ, as there is no protection for the equipment.

United States Patent Application 20170011503 discloses a ground based wind turbine blade inspection system and method consists of a thermal imaging camera configured to detect propagating defects by acquiring thermal imaging data from a wind turbine blade when it is substantially at thermal equilibrium with respect to surrounding air and analyzing the thermal imaging data with a processor to identify thermal effects associated with latent defects caused by internal friction due to cyclic gravitational stresses and wind loads during normal turbine operation. The system permits latent defects to be identified using a ground-based in situ inspection before they become visually apparent, which allows repairs to be made economically while the blade is in place. This system would not be suitable for assessing gear integrity in situ, as there is no protection for the equipment. Further, there is no means for identifying the part that is affected.

United States Patent Application 20110125420 discloses a system and method for enhancing inspections using infrared cameras through in-field displays and operator-assisted performance calculations. A handheld infrared imaging system typically includes an infrared camera having a programmed computer and an interactive user interface suitable for displaying images and prompting response and accepting input from the infrared camera operator in the field during an inspection. An operator may designate at least one thing of interest on a displayed infrared image; and the programmed computer may use a performance algorithm to estimate performance associated with the thing of interest. The programmed computer may extract information or parameters from previously measured data. The programmed computer may vary the way in which it displays new measurements based on the information extracted from the stored data. One or more of the parameters extracted from the IR image may be adapted to provide an automated alert to the user. This system would not be suitable for assessing gear integrity in situ as it is a hand-held unit. Further, there is no means for identifying the part that is affected other than a user identifying a part or region on interest. This, therefore, can introduce human error.

United States Patent Application 20080028846 discloses a method and apparatus to automatically inspect or pre-screen the equipment of passing commercial motor vehicles (CMVs) employs the novel application of acquiring, processing and analyzing the temperature data from areas of interest on passing wheels using a computer-based imaging system to improve the efficiency of current CMV inspecting and/or pre-screening manual methods that require an inspection system operator. The inspection system includes a triggering device, thermographic camera(s), computer-based image acquisition hardware, image processing and analysis software, user interface and operator workspace (herein referred to as the "Inspection System"). The components of the apparatus are not limited to the list above nor are all components required to embody the method for inspection or pre-screening of equipment of passing CMVs. The method is a means of collecting the thermal information of the equipment as it passes through an inspection area and analyzing it to determine or estimate its condition or fitness. The thermal properties of passing equipment is used to analyze for anomalies and comparison to thermal properties of equipment in good working condition, or thermal properties of other similar equipment on the same CMV. Test results that lie outside the parameters of either absolute or relative test rules-for-fitness are flagged and pulled out of the flow of traffic for further investigation. This system only allows comparison between reference equipment and the equipment being assessed. It does not allow for taking assessments over time, nor does it permit identification of a region of a part of interest.

U.S. Pat. No. 6,992,315 discloses a system (10) for imaging a combustion turbine engine airfoil includes a camera (12) and a positioner (24). The positioner may be controlled to dispose the camera within an inner turbine casing of the engine at a first position for acquiring a first image. The camera may then be moved to a second position for acquiring a second image. A storage device (30) stores the first and second images, and a processor (32) accesses the storage device to generate a composite image from the first and second images. For use when the airfoil is rotating, the system may also include a sensor (40) for generating a position signal (41) responsive to a detected angular position of an airfoil. The system may further include a trigger device (42), responsive to the position signal, for triggering the camera to acquire an image when the airfoil is proximate the camera.

What is needed is a system and method suited to industrial, and more specifically mine sites, to accurately and quickly identify and locate defects and wear in gears during normal operation. It would be preferable if the system also allowed for monitoring for damage, such as broken teeth, contamination in the gear set, misalignment, poor lubricant patterns, uneven wear patterns and the like during normal operation. It would be of further advantage if gear life could be extended by monitoring repeatedly over time, thus the system would preferably be part of an installation on site. As debris can contaminate or damage the system, it would be preferable if it was protected from the ambient with a transparent layer. It would be advantageous if the resulting data were sent directly to a computer, analyzed, displayed and archived. It would be of a still greater advantage if the data could be used to develop predictive models of wear. It would be of greater advantage if the system was autonomous, as this would reduce the chance for human error.

SUMMARY

The present technology is a system and method suited to industrial, and more specifically mine sites, to accurately and quickly identify and locate defects and wear in gears during normal operation. The system also allows for monitoring for damage, such as broken teeth, contamination in the gear set, misalignment, poor lubricant patterns, uneven wear patterns and the like during normal operation under full load and speed. The system is provided as part of an installation and includes an air blade to reduce or eliminate debris contaminating or damaging the system. It is anticipated that gear life will be extended by monitoring repeatedly over time. Advantageous the resulting data are sent directly to a computer, analyzed, displayed and archived. The data can be used to develop predictive models of wear. As the system is autonomous, there is little or no chance of human error.

In one embodiment, an installation, for use with a computer is provided, for inspecting surfaces of metallic members that contact and move over one another repeatedly, the installation comprising: an enclosure, the enclosure including a back, a top, a bottom, sides and a front, which includes an opening, to define an interior; a transparent window, the transparent window separating at least a part of the interior from an ambient environment; at least one door operatively connected to the enclosure and retractably separating the transparent barrier from the ambient environment; a programmable logic controller which is housed in the enclosure behind the transparent window; a thermal imager which is housed in the enclosure behind the transparent window, is directed to the transparent window and is in electronic communication with the programmable logic controller; a visible light camera which is housed in the enclosure behind the transparent window, is directed to the transparent window and is in electronic communication with the programmable logic controller; and an air barrier blower which is attached to the enclosure and is positioned to provide an air barrier in front of the transparent window.

In the installation the thermal imager may be an infrared camera.

The installation may further comprise a user interface which is in electronic communication with the programmable logic controller.

The installation may further comprise the computer, which is in electronic communication with the programmable logic controller and the user interface.

In the installation the user interface and computer may be remote to the enclosure.

In the installation, the air barrier blower may be an air blade blower.

In the installation the transparent window may be releasably retained in the enclosure.

In another embodiment, a method of autonomously inspecting surfaces of metallic members that contact and move over one another repeatedly is provided, the method comprising: selecting an installation that includes a housing, a thermal imager housed in the housing, a machine vision camera housed in the housing, a computer, a user interface, a programmable logic controller in electronic communication with the thermal imager, the machine vision camera, the computer and the user interface, and an air barrier blower attached to the housing; the programmable logic controller instructing the air blade blower to produce an air barrier between an ambient environment and both the thermal imager and the machine vision camera; the programmable logic controller instructing the thermal imager to take thermal images of the metallic members and the machine vision camera to take stop action visual light images of the metallic members; the programmable logic controller collecting the images; and the user interface displaying the images.

The method may further comprise the computer generating a raw data set from the images.

The method may further comprise the computer archiving the raw data set.

The method may further comprise the computer analyzing the raw data set to produce an analyzed data set.

The method may further comprise the computer archiving the analyzed data set.

In the method, the metallic members may be a gear set.

In the method the metallic members may be a girth gear set.

In the method, at least one tooth of a pinion gear of the girth gear set may be inspected.

In the method, the girth gear set may be operating under normal operating conditions.

In the method, the girth gear set may be under full load.

The method may further comprise the computer utilizing computer vision to detect an edge of the tooth of the pinion gear.

The method may further comprise the computer comparing the edge of the tooth to an edge of a new pinion gear tooth.

The method may further comprise the computer passing or failing the pinion gear on the basis of the comparison.

In yet another embodiment, a system for housing in an enclosure in a gear guard for a gear set is provided, the system comprising a programmable logic controller; a thermal imager which is in electronic communication with the programmable logic controller; a visible light camera which is in electronic communication with the programmable logic controller; and an air blade blower which is in electronic communication with the programmable logic controller and is positioned to produce an air blade between the gear set and both the thermal imager and the visible light camera.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Air blade—in the context of the present technology, an air blade is synonymous with an air knife or an air curtain and is a laminar air flow that provides a barrier to air movement through the blade. It is a specific form of a light transparent barrier and reduces or eliminates movement of debris, particulates and gases through the barrier.

Air barrier—in the context of the present technology, an air barrier includes air forced under pressure from a series of nozzles or from an air blade-type blower. The air barrier reduces or eliminates movement of material from the ambient towards the enclosure.

Air barrier blower—in the context of the present technology, an air barrier-type blower is a manifold with nozzles, a series of nozzles, an air blade-type blower or a combination thereof, the caveat being that it produces an air barrier.

Normal operating conditions—in the context of the present technology, normal operating conditions means that the gear is lubricated and rotating at full speed, which, for the girth gear is about 15 revolutions per minute to about 20 revolutions per minute.

Full load—in the context of the present technology, full load means the gear set is operating at a torque that would be known to one skilled in the art as being an operating torque, which would be about 90% to about 100% full load rating to as high as about 130% full load rating.

Visible light camera—in the context of the present technology, a visible light camera includes a visible light video camera and a high shutter speed camera.

DETAILED DESCRIPTION

In one specific application, the operating temperature profile of a gear, for example a pinion gear of a girth gear set, gives an indication of the pinion gear's overall alignment with the girth gear. High differential temperatures from one end of a tooth to the other end of the tooth indicate one or more of misalignment, poor lubrication and contamination. Online temperature monitoring of the pinion teeth with infrared temperature sensors is the most consistent and effective means of collecting this information. This allows the user to quickly detect and correct any misalignment that may develop. If the gear is misaligned, the infrared sensor will detect a region of higher heat. A broken tooth will be seen in the stop action photography. Computer Vision edge detection is used to detect the best edges on the image and to compare the edges with the edges of a new gear tooth. Poor lubrication and contamination will result in regions of higher temperature. Visible light imagery will identify the location on the gear tooth, but may or may not confirm these conditions, as there may not be visual difference between a region of poor lubrication and a region of adequate lubrication. Similarly, contamination, unless large, will not be picked up by the visible light camera, however, the location of higher temperature detected by the infrared camera will pinpointed by using the two imaging devices concomitantly.

The system was designed to allow continuous sensing of the pinion gear temperatures under full load operating conditions with an infrared sensor and stop action visible light camera and can be integrated into most equipment monitoring systems. An alarm is sent if the temperature is above the normal operating temperature.

Figure 1:
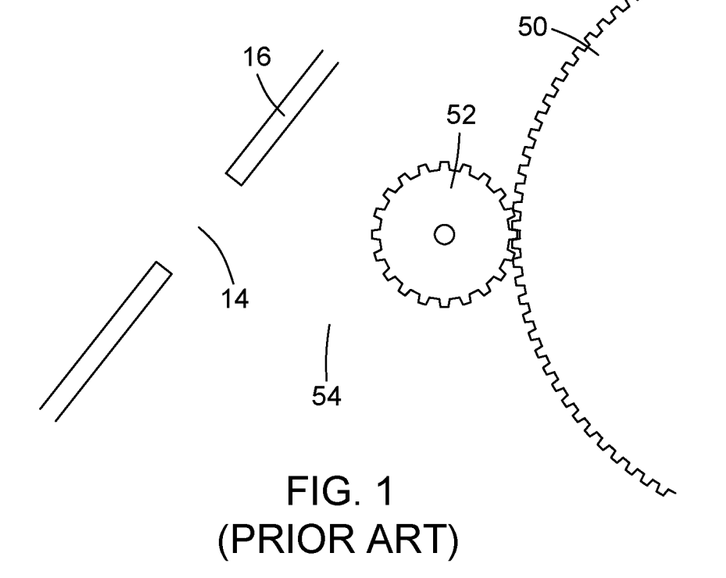
FIG. 1 is a schematic of a prior art gear guard and window.

A prior art gear guard 16 is shown in FIG. 1. It has an inspection window 14, which is directed to the interior 54 of the gear guard where the gear set, which comprises a girth gear 50 and a pinion gear 52 are housed.

Figure 2:
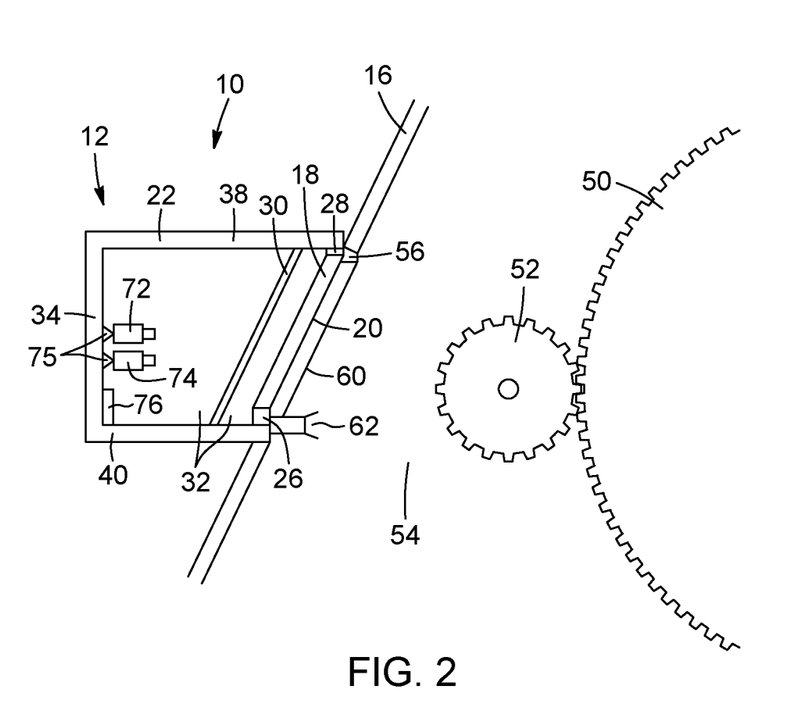
FIG. 2 is a schematic of a sectional view of an installation for placement in a gear guard window.
Figure 3:
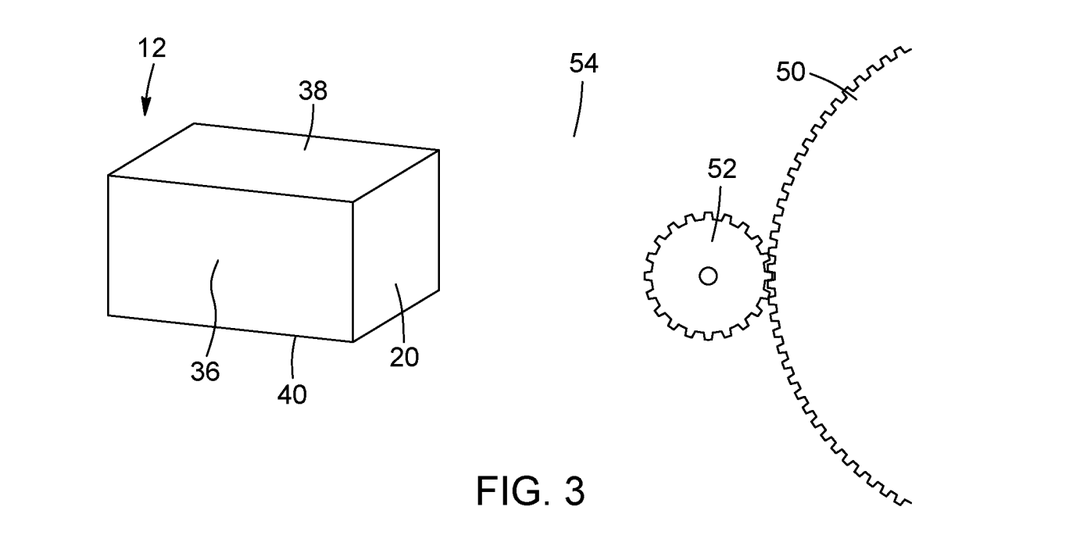
FIG. 3 is a schematic of a perspective view of the enclosure of the installation of FIG. 2.

An installation, generally referred to as 10, is shown in FIG. 2. The installation 10 has an enclosure, generally referred to as 12, that is sized to fit in an the inspection window 14 of a gear guard 16, as shown in FIG. 1. A pair of doors 18 are retractably attached to the enclosure 12 at a front 20. In one embodiment, the doors 18 are attached to the frame 22 of the enclosure 12 with hinges. In another embodiment, the doors 18 are in slidable engagement with a pair of lower slides 26 and a pair of upper slides 28 in the frame 22. In both embodiments, a light transparent protective barrier 30 is located behind the doors 18 in the interior 32 of the enclosure 12. As shown in FIGS. 2 and 3, the enclosure 12 has a back 34, sides 36, a top 38, a bottom 40 and the front 20 which are constructed of metal, with the exception of the light transparent protective barrier 30.

Figure 4:
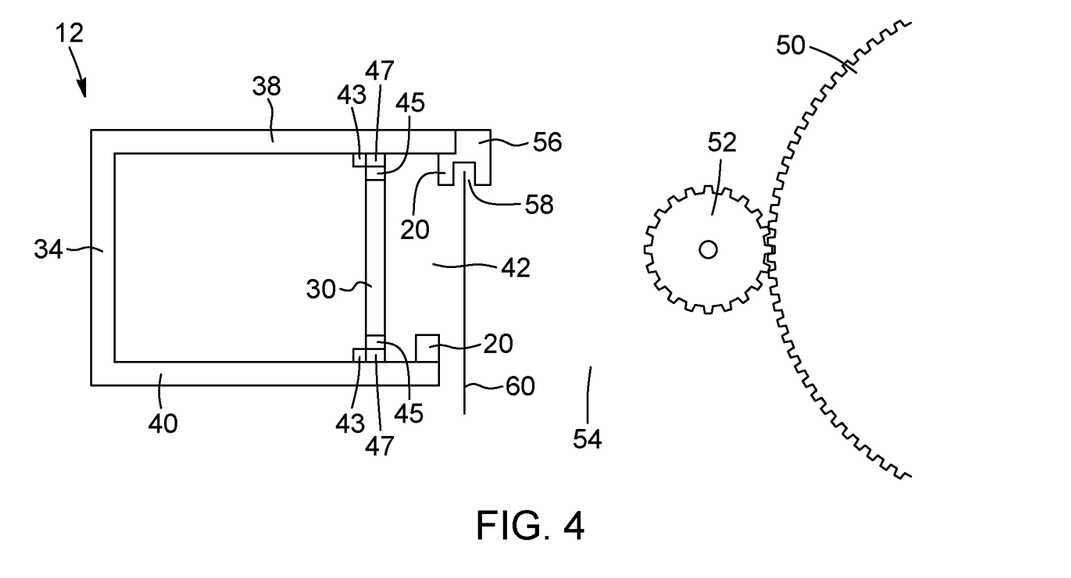
FIG. 4 is a schematic of a sectional view of the enclosure showing the air blade of the installation of FIG. 2.
Figure 5:
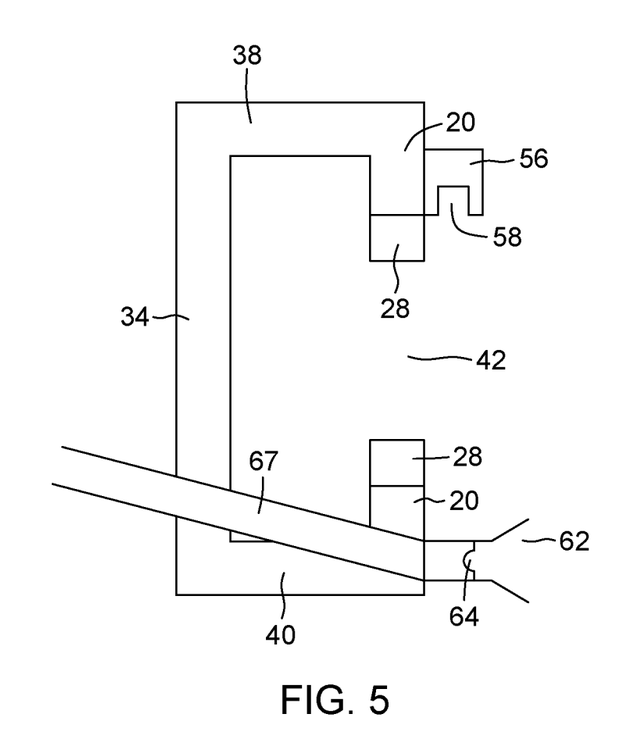
FIG. 5 is a schematic of a section view of the enclosure showing the cleaning solution nozzle of the installation of FIG. 2.

As shown in FIG. 4, the light transparent protective barrier 30 covers the opening 42 defined by the open doors 18 and the front 20. The light transparent barrier 30 is releasably retained with clamps 43 and there is a gasket 45 between the light transparent barrier 30 and the frame 47 that retains it. The front 20 faces the gear set which includes a girth gear 50 and a pinion gear 52, which are located in the interior 54 of the gear guard 16. An air blade blower 56 is mounted on the front 20 of the enclosure 12, proximate or at the top 38. The air blade blower 56 has a linear aperture 58 that is at least as wide as the light transparent protective barrier 30. Air is forced through the linear aperture 58 at high velocity to produce an air blade 60 that covers the opening 42. As shown in FIG. 5, at least one nozzle 62 and preferably two or more nozzles 62 are attached to the enclosure 12 and are directed to the gear set 50, 52. The nozzles 62 include a quick release mechanism 64 which is for attachment to hosing 67. The quick release mechanism 64 is preferably a push to connect coupler or a lug push to connect coupler. The hosing 67 is in fluid communication with a cleaning solution.

Figure 6A:
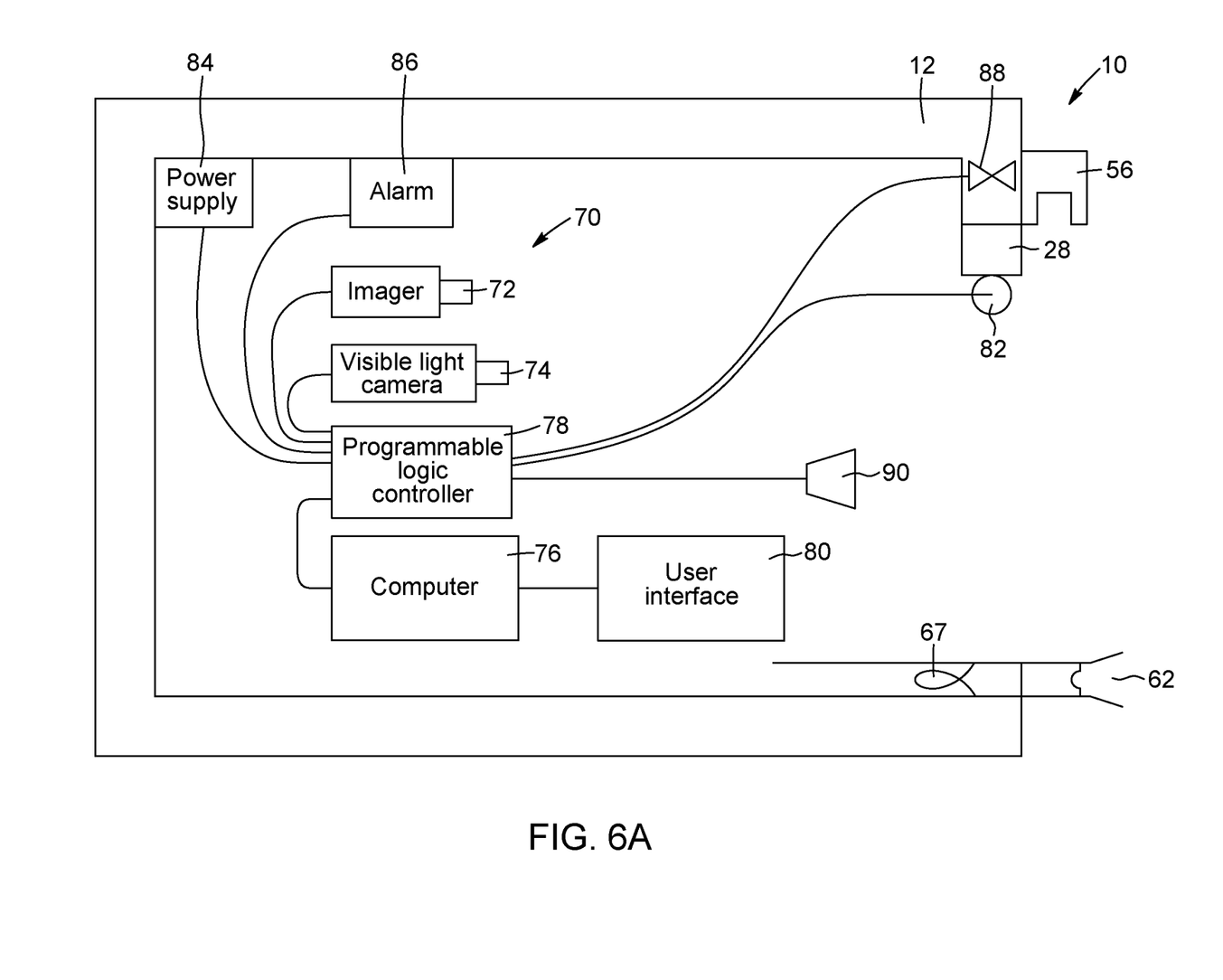
FIG. 6A is a schematic of the system of the installation of FIG. 2.
Figure 6B:
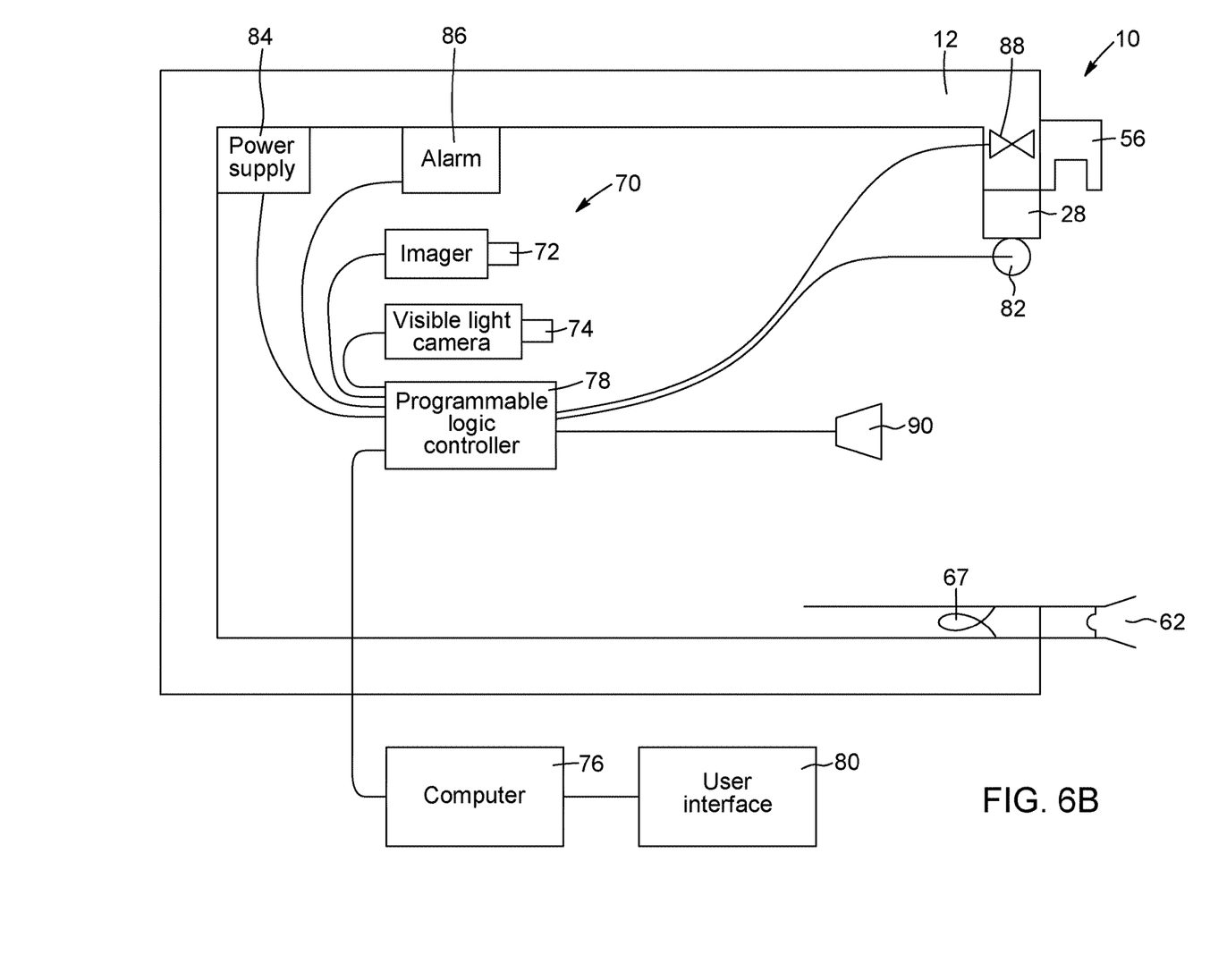
FIG. 6B is a schematic of an alternative embodiment of FIG. 6A.

As shown in FIG. 6, a system, generally referred to as 70 is housed in the enclosure 12 of the installation 10. The system 70 includes: a thermal imaging device 72, which may be, but is not limited to an infrared camera, an infrared non-contact temperature sensor, a thermal imager, or a thermal smartphone module; a visible light camera 74; a computer 76; a programmable logic controller 78; and a user interface 80, which may be integral to the computer 76 and may be a touch screen and is located on the outside of the back 34 of enclosure 12. Returning to FIG. 2, both the visible camera 74 and the thermal imaging device 72 are mounted on pivot mounts 75. As shown in FIG. 6, the computer 76 is in electronic communication with the infrared camera 72, the visible light camera 74 and the programmable logic controller 78. The programmable logic controller 78 is in electrical communication with the air blade-type blower 56, a pair of door actuators 82, the infrared camera 72, the visible light camera 74, a power supply 84, an alarm 86, the solenoid valve 88 that controls the air blade-type blower 56, and a strobe light 90. In an alternative embodiment, the computer 76 is remote to the remainder of the system 70 but is in electronic communication with the system 70. The visible light camera 74 operates at a high shutter speed, for example about $\frac{1}{200}^{th}$ of a second to about $\frac{1}{1000}$th second or faster. The visible light camera 74 may be a video camera.

Figure 7A:
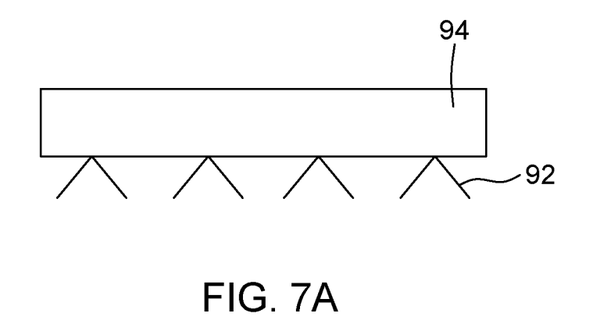
FIG. 7A is a schematic of an alternative embodiment.
Figure 7B:
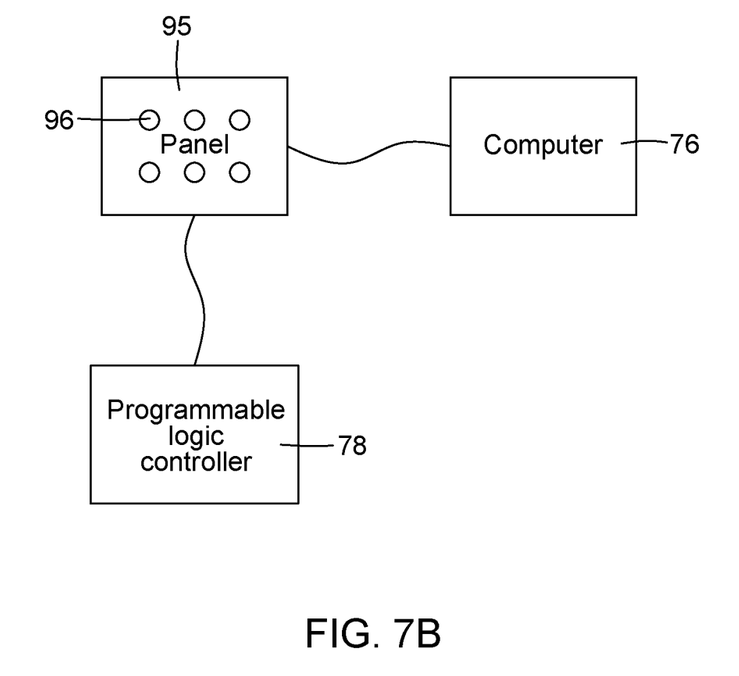
FIG. 7B is a schematic of yet another alternative embodiment.

In an alternative embodiment, shown in FIG. 7A, the air blade blower 56 is replaced with a series of high-pressure nozzles 92, which may be a manifold 94 with a series of nozzles 92. In another alternative embodiment shown in FIG. 7B, the user interface 80 may be replaced with a panel 95 with buttons 96 that are in electrical communication with the computer 76 and the programmable logic controller 78. This allows for a manual override of the system 70. As would be known to one skilled in the art, the various alternative embodiments may be combined with one another in any configuration.

Figure 8:
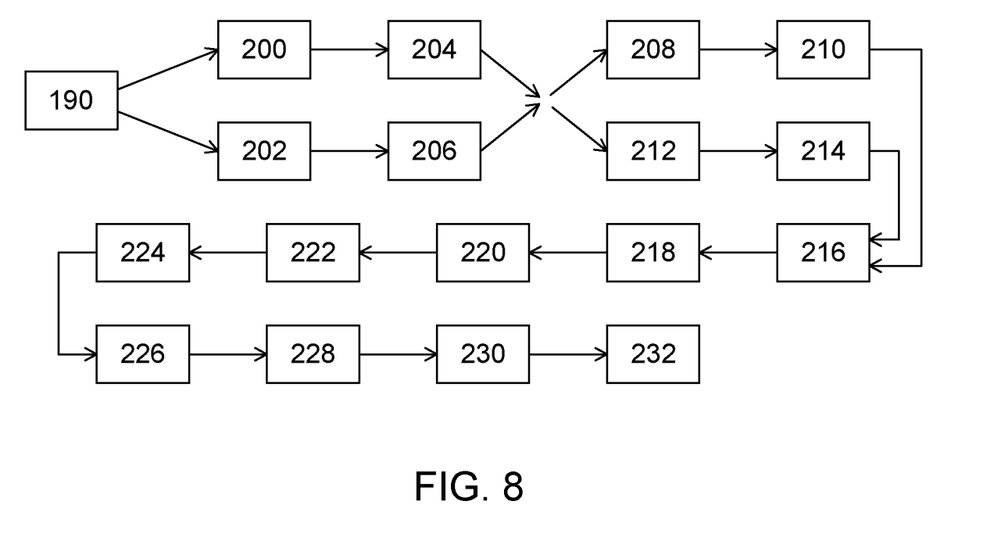
FIG. 8 is a block diagram outlining the steps in operating the installation.

As shown in FIG. 8, the gear set continues to turn at standard operating speed. The programmable logic controller 78 is turned on 190 and starts 200 the air blade type blower 56 and activates 202 the door actuators, producing 204 an air blade 60 (a laminar flow of high velocity air) and the doors opening 206, respectively. The programmable logic controller 78 then starts 208 the visible light camera 74, which takes 210 stop action photos, while at the same time, starts 212 both the thermal imaging device 72, which collects 214 thermal images and the strobe light 90. The photographs and images may be collected for about 30 seconds and are sent 216 to the computer where the data are stored 218 and analyzed 220. Then the programmable logic controller 78 instructs 222 the visible light camera 74 and the thermal imaging device 72 to stop taking photos and collecting images, respectively. The devices 72, 74 stop 224. The programmable logic controller 78 instructs 226 the actuators 82 to close the doors and the doors close 228. The programmable logic controller 78 then instructs 230 the air blade type blower 56 to stop and it stops 232.

Figure 9:
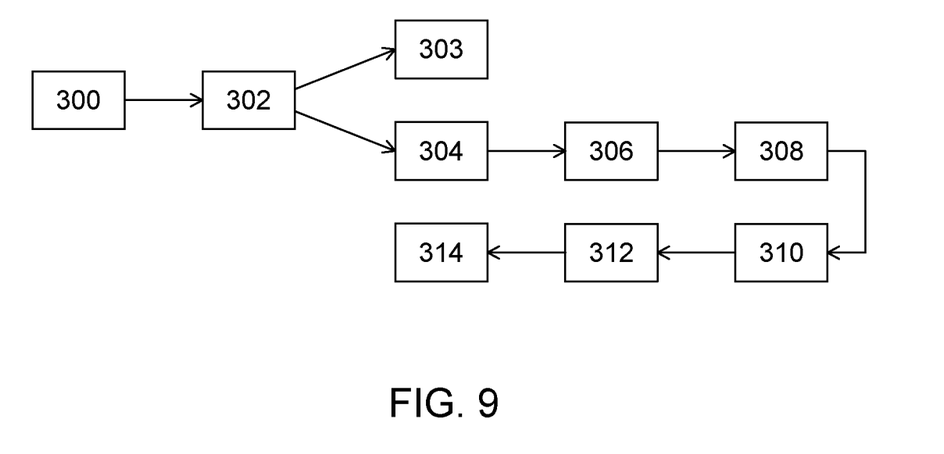
FIG. 9 is a block diagram outlining the steps in collecting and analyzing the data from the system of FIGS. 6A and 6B.

A block diagram of data analysis is shown in FIG. 9. The raw data are sent 300 from the thermal imaging device 72 to the computer 76, where they are stored 302 as raw data. Raw data may be displayed 303 as a thermograph on the user interface 78. The raw data are analyzed 304 and the analyzed data are archived 306 and displayed 308 as three-dimensional images on a user interface 84, which may be integral with the computer 76 or may be separate. The pinion Delta Temperature ($\Delta T$) is determined 310 by the computer and is the temperature variation from the far left of the pinion gear tooth to the far right of the pinion gear tooth. This is typically the number used to determine the quality of the pinion to gear alignment. A properly aligned pinion gear will have a higher temperature on the right/drive end of the tooth than on the left end of the tooth. The temperature can be displayed on a graph of temperature versus distance from one end of the gear tooth to the other end of the gear tooth.

For wear, the data are associated 312 with time stamps to produce 314 predictive models for wear.

Example 1

For bearings and bearing races, the combination of the two cameras, the infrared camera and the machine vision camera, provide detailed information on the state of the bearings in the bearing race. Wear and breakage can be identified by comparing the edge characteristics of a new bearing to that of a bearing that is in the bearing race and is functioning under normal operating conditions. A region of higher heat will be indicative of wear or breakage. The photographs from the visible light camera (machine vision) will show breakage and may show wear. The visible light camera photographs may be analyzed using edge detection software or can be reviewed by an operator. Contamination may also be seen in the photographic images from the visible light camera and from an increase in temperature in the infrared images. Poor lubrication patterns can also be seen in the photographic images from the visible light camera and from an increase in temperature in the infrared images. The data can be archived as raw data and can be analyzed and archived as analyzed data.

Example 2

For girth gear sets, the combination of the two cameras, the infrared camera and the machine vision camera, provide detailed information on the state of the pinion gear. Wear and breakage can be identified by comparing the edge characteristics of a new gear tooth to that of a gear tooth that is functioning under normal operating conditions. A region of higher heat will be indicative of wear or breakage. The photographs from the visible light camera (machine vision) will show breakage and may show wear. The visible light camera photographs may be analyzed using edge detection software or can be reviewed by an operator. The machine vision camera takes photographs of a new gear tooth, then edge detection software traces the edge of a new tooth and records the data that represent the edge of the new gear tooth. These data are then used to compare the edge of a gear tooth of interest to the edge of the new gear tooth by again photographing the gear tooth of interest, applying the edge detection software to the photographs to obtain a data set representative of the edge of the tooth of interest and comparing the data. Contamination may also be seen in the photographic images from the visible light camera and from an increase in temperature in the infrared images. Poor lubrication patterns can also be seen in the photographic images from the visible light camera and from an increase in temperature in the infrared images. The data can be archived as raw data and can be analyzed and archived as analyzed data. Predictive models of wear can be developed from the data collected over time.

The invention claimed is:

1. An installation, for use with a computer, for inspecting surfaces of a pinion gear of a girth gear set operating under standard operating conditions in situ, the installation comprising: an enclosure, the enclosure including a back, a top, a bottom, sides and a front, which includes an opening, to define an interior; a transparent window, the transparent window separating at least a part of the interior from an ambient environment; at least one door operatively connected to the enclosure and retractably separating the transparent window from the ambient environment; a programmable logic controller housed in the enclosure behind the transparent window; a thermal imager housed in the enclosure behind the transparent window, is directed to the transparent window and is in electronic communication with the programmable logic controller; a visible light camera housed in the enclosure behind the transparent window, is directed to the transparent window and is in electronic communication with the programmable logic controller; and an air barrier blower attached to the enclosure and is positioned to provide an air barrier in front of the transparent window.

2. The installation of claim 1, wherein the thermal imager is an infrared camera.

3. The installation of claim 2, further comprising a user interface which is in electronic communication with the programmable logic controller.

4. The installation of claim 3, further comprising the computer, which is in electronic communication with the programmable logic controller and the user interface.

5. The installation of claim 4, wherein the user interface and computer are remote to the enclosure.

6. The installation of claim 5, further comprising at least one nozzle attached to the enclosure and directed to the girth gear set.

7. The installation of claim 6, wherein the transparent window is releasably retained in the enclosure.

8. A method of autonomously inspecting surfaces of a pinion gear of a girth gear set under standard operating conditions in situ, the pinion gear comprising a plurality of teeth, the method comprising: selecting an installation that includes a housing, a thermal imager housed in the housing, a machine vision camera housed in the housing, a computer, a user interface, a programmable logic controller in electronic communication with the thermal imager, the machine vision camera, the computer and the user interface, and an air barrier blower attached to the housing; instructing the air barrier blower to produce an air barrier between an ambient environment and both the thermal imager and the machine vision camera with the programmable logic controller; instructing the thermal imager to take thermal images of each tooth and the machine vision camera to take stop action visual light images of each tooth with the programmable logic controller; collecting the images with the programmable logic controller; and displaying the images with the user interface.

9. The method of claim 8, further comprising generating a raw data set from the images with the computer.

10. The method of claim 9, further comprising archiving the raw data set with the computer.

11. The method of claim 10, further comprising analyzing the raw data with the computer set to produce an analyzed data set.

12. The method of claim 11, further comprising archiving the analyzed data set with the computer.

13. The method of claim 12, wherein the girth gear set is operating under normal operating conditions.

14. The method of claim 13, wherein the girth gear set is under full load.

15. The method of claim 14, further comprising utilizing the computer to generate computer vision edge detection to detect an edge of the tooth of the pinion gear.

16. The method of claim 15, further comprising comparing the edge of the tooth to an edge of a new pinion gear tooth with the computer.

17. The method of claim 16, further comprising utilizing the computer to pass or fail the pinion gear on the basis of the comparison.

18. The method of claim 17, wherein the inspecting is continuous.

19. A system for housing in an enclosure in a gear guard for a girth gear set at an industrial site, the system comprising a programmable logic controller; a thermal imager in electronic communication with the programmable logic controller; a visible light camera in electronic communication with the programmable logic controller; and an air blade blower in electronic communication with the programmable logic controller and is positioned to produce an air blade between the gear set and both the thermal imager and the visible light camera.

\* \* \* \* \*